United States Patent [19]
Munnerlyn et al.

[11] 3,871,772
[45] Mar. 18, 1975

[54] EYE EXAMINING INSTRUMENT ALIGNING MEANS AND METHOD THEREFOR

[75] Inventors: Charles R. Munnerlyn, Fairport; Robert C. Moore, Rochester, both of N.Y.

[73] Assignee: Tropel, Inc., Fairport, N.Y.

[22] Filed: Apr. 23, 1973

[21] Appl. No.: 353,648

[52] U.S. Cl. .......................... 356/153, 351/1, 351/6, 351/13, 351/39, 356/172
[51] Int. Cl. ......................... G01b 11/27, A61b 3/00
[58] Field of Search ............. 350/2; 351/1, 6, 9, 13, 351/16, 39; 356/153, 172

[56] References Cited
UNITED STATES PATENTS

| | | | |
|---|---|---|---|
| 2,536,305 | 1/1951 | Morton | 351/9 |
| 3,407,302 | 10/1968 | Bouwers | 350/2 X |
| 3,518,005 | 6/1970 | Weber | 356/172 X |
| 3,572,909 | 3/1971 | Van Patten | 351/9 X |
| 3,600,098 | 8/1971 | Mohrman | 351/6 X |
| 3,640,610 | 2/1972 | Nupuf | 351/39 X |

*Primary Examiner*—Paul A. Sacher
*Attorney, Agent, or Firm*—Cumpston, Shaw & Stephens

[57] ABSTRACT

An eye viewer uses a source of infra red light directed on the eye, an image intensifier, means for focusing reflected infra red light from the eye on the image intensifier, and means for viewing the image intensifier for observing a visible image of the eye. Such an eye viewer is associated with an eye examining instrument for aligning and positioning the instrument relative to the eye by viewing the centering of the light from the instrument on the eye and the centering of the image of the eye in the field of view of the eye viewer.

3 Claims, 4 Drawing Figures

PATENTED MAR 18 1975　　　3,871,772

EYE EXAMINING INSTRUMENT ALIGNING MEANS AND METHOD THEREFOR

THE INVENTIVE IMPROVEMENT

Many different instruments and examination procedures require viewing of the eye, and yet the visible light used in illuminating the eye is also visible to the eye being examined, and causes various problems including constriction of the pupil of the eye. The invention involves recognition of the advantages of a way to view the eye with infra red light invisible to the eye and not producing reflex reactions. The invention also proposes use of an infra red eye viewer for aligning an eye examining instrument, and the invention aims at simplicity, economy, reliability, and practicality in an eye viewer suitable for many purposes.

SUMMARY OF THE INVENTION

The inventive eye viewer uses a source of infra red light directed on the eye, an image intensifier, means for focusing reflected infra red light from the eye on the image intensifier, and means for viewing the image intensifier for observing a visible image of the eye. Such a viewer is combined with an eye-examining instrument for observing the alignment of the instrument with the eye being examined, and the invention includes an instrument alignment method involving focusing the reflected infra red light from the eye on an image intensifier off the axis of the instrument and viewing the image of the eye for adjusting the alignment and spacing of the instrument.

DRAWINGS

DETAILED DESCRIPTION

Figure 1:
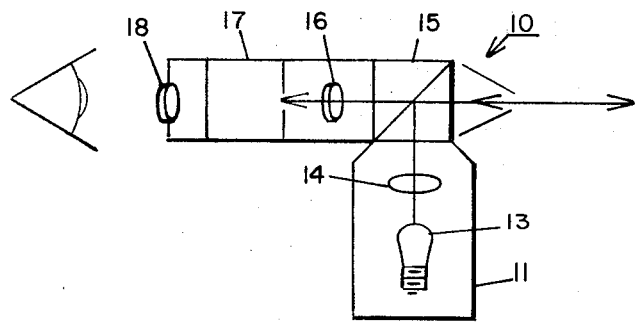
FIG. 1 is a schematic view of an eye viewer according to the invention.

A simplified, schematic form of the inventive viewer 10 is shown in FIG. 1 and includes a housing 11 holding a source of infra red light 13. Light from source 13 passes through a lens 14 that can include a filter and is then directed outward by beam splitter 15. Reflected light passes back through beam splitter 15 and is focused by lens 16 on image intensifier 17 which is viewed through an eyepiece 18.

The infra red light directed onto an eye is not visible to the eye being examined, and reflected infra red light from the eye being examined would not be visible to the examiner except that the inventive eye viewer makes this possible through use of image intensifier 17. A basic viewer such as simplified in FIG. 1 can be used in association with other eye examining equipment as illustrated in FIGS. 2 and 3.

Figure 2:
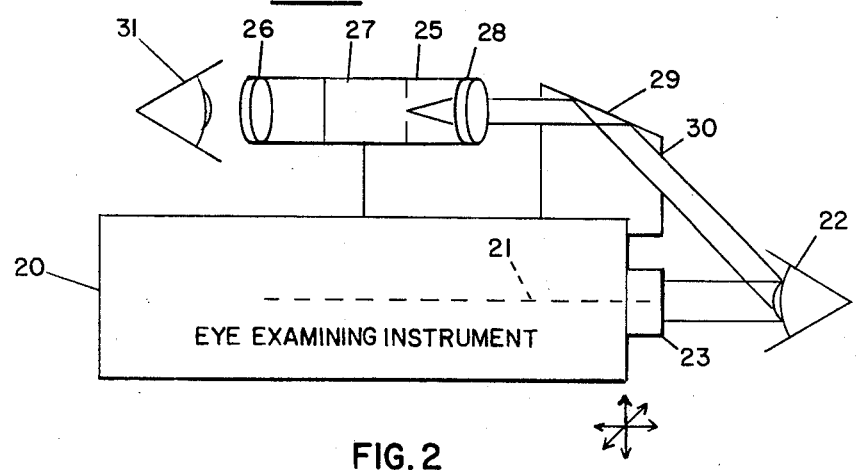
FIG. 2 is a schematic, elevational view of a preferred embodiment of the inventive eye viewer associated with an eye examining instrument.
Figure 3:
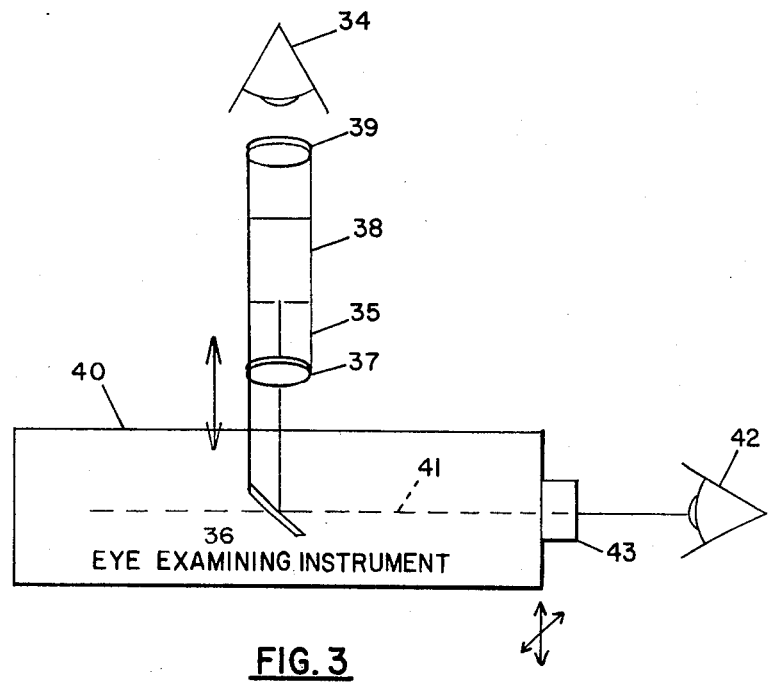
FIG. 3 is a schematic elevational view of another preferred embodiment of the inventive eye viewer associated with an eye examining instrument.

Eye examining instrument 20 of FIG. 2 can be any eye-examining instrument that would benefit from use of infra red light, and one example is a refractor for objectively measuring the refractive error of an eye. Instrument 20 has an optical axis 21 aligned with eye 22 so that infra red light can be directed along axis 21, through eyepiece 23, and onto eye 22. Instrument 20 is adjustable on x, y and z axes as shown by the arrows for registering optical axis 21 accurately with eye 22 and spacing eye 22 accurately from eyepiece 23.

The inventive eye viewer 25 is supported on instrument 20 and includes an eyepiece 26 for viewing an image intensifier 27 on which an image of eye 22 is focused by objective 28 receiving light from mirror 29 through aperture plate 30. This arrangement uses reflected infra red light from eye 22 off optical axis 21 to make an image of eye 22 visible to an observer 31. The field of view of image intensifier 27 is fixed by objective 28, mirror 29, and aperture plate 30 relative to instrument 20 so that the field of view of image intensifier 27 intersects optical axis 21 at the region where eye 22 should be positioned for proper alignment and spacing from instrument 20 and eyepiece 23.

The region of eye 22 illuminated by light from the optical system of instrument 20 can be viewed by observer 31 via image intensifier 27, and instrument 20 can be moved transversely to axis 21 until the illuminated area is centered on the pupil of eye 22. This ensures that eye 22 is centered on optical axis 21. The distance of eye 22 from eyepiece 23 can also be adjusted by centering the image of eye 22 in the field of view of image intensifier 27. If eye 22 is too close to eyepiece 23, the upper region of eye 22 will be centered in the field of view of image intensifier 27, and if eye 22 is spaced too far from eyepiece 23, the lower region of eye 22 will be centered in the field of view of image intensifier 27. An appropriate axial adjustment of instrument 20 can then be made to center eye 22 in the field of view of image intensifier 27 for perfect spacing as well as alignment of eye 22 relative to instrument 20.

Figure 4:
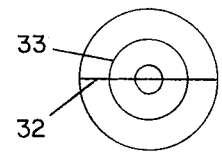
FIG. 4 is a view of an eye through the inventive eye viewer.

To aid in centering the image of the eye in the field of view of intensifier 27, a horizontal mark 32 is preferably centered on or adjacent image intensifier 27 so that instrument 20 can be adjusted axially to center line 32 through the viewed image 33 of an eye 32 as shown in FIG. 4. With line 32 centered on eye image 33 as illustrated, and the illumination from instrument 20 observed as centered on the pupil of eye image 33, instrument 20 is accurately aligned and positioned relative to eye 22. Of course an eye viewer can view the eye from below or from the side as easily as from above to accomplish the same aligning and positioning.

Instrument 40 of FIG. 3 is similar to instrument 20 in having an optical path 41 registered with eye 42 through eyepiece 43. Infra red light reflected from eye 42 travels back along optical path 41 for detection by instrument 40, and eye viewer 35 is movable transversely of optical path 41 for aligning instrument 40. A mirror or beam splitter 36 is movable into and retractable out of optical path 41, and viewer 35 and element 36 can be positioned as illustrated to intercept infra red light reflected from eye 42. Reflected light diverted by beam splitter or mirror 36 is focused by objective 37 on image intensifier 38 and viewed through eyepiece 39 by observer 34.

Instrument 40 can be moved on an x or y axis to center the illumination from instrument 40 on the pupil of eye 42. After alignment, viewer 35 is retracted to withdraw mirror or beam splitter 36 from optical path 41 to allow examination of eye 42. The arrangement of FIG. 3 is somewhat simpler than FIG. 2 but cannot determine the spacing of eye 42 from eyepiece 43.

Persons wishing to practice the invention should remember that other embodiments and variations can be adapted to particular circumstances. Even though one point of view is necessarily chosen in describing and defining the invention, this should not inhibit broader or related embodiments going beyond the semantic orientation of this application but falling within the spirit of the invention. For example, those skilled in the art will understand the various arrangements of mirrors, beam splitters, focusing lenses, eyepieces, and other optical elements cooperating with an image intensifier for viewing an eye illuminated by infra red light for various purposes.

I claim:

1. An eye viewer for aligning the optical axis of an eye examining instrument with an eye and spacing said instrument a predetermined distance from said eye, said viewer comprising:
    a. a source of radiant energy;
    b. means for directing a beam of said radiant energy on said eye along said optical axis;
    c. means mounted on said instrument off said optical axis for forming a viewable image from said radiant energy;
    d. means for focusing radiant energy reflected from said eye at an acute angle from said optical axis and onto said image forming means so the field of view of said image forming means intersects said optical axis at said predetermined distance from said eye;
    e. means for adjusting said instrument transversely of said eye for centering said radiant energy beam on said eye as viewed in said image forming means to align said beam with said eye; and
    f. means for adjusting said instrument in the direction of said optical axis to center said image of said eye in said field of view of said image forming means for spacing said instrument said predetermined distance from said eye.

2. The viewer of claim 1 including a mark fixed relative to said image forming means to aid in said centering of said eye in said field of view of said image forming means.

3. A method of aligning and spacing an instrument relative to an eye for objectively measuring the refractive error of said eye by directing a beam of radiant energy along an optical axis onto said eye and monitoring the radiant energy reflected from the retina of said eye back along said optical axis, said aligning and spacing method comprising:
    a. gathering radiant energy reflected from said eye at an acute angle from said optical axis;
    b. focusing said gathered reflected radiant energy on an image forming means;
    c. fixing the field of view of said image forming means to intersect said optical axis of said instrument at a predetermined distance from said instrument;
    d. viewing the image of said eye formed by said image forming means;
    e. adjusting said instrument transversely of said eye until said radiant energy beam is centered on said eye as observed on said image forming means; and
    f. adjusting the spacing of said instrument from said eye by moving said instrument and said image forming means together until said image of said eye is centered in said field viewed by said image forming means.

* * * * *